United States Patent [19]

Pedersen

[11] 3,917,813
[45] Nov. 4, 1975

[54] ORAL DRUG PREPARATIONS

[75] Inventor: Arne Martinus Pedersen, Vanlose, Denmark

[73] Assignee: A/S Alfred Benzon, Copenhagen, Denmark

[22] Filed: Mar. 20, 1974

[21] Appl. No.: 453,032

[52] U.S. Cl. .................... 424/20; 424/19; 424/32; 424/35
[51] Int. Cl.² .......................................... A61K 27/12
[58] Field of Search .............. 424/19–22, 424/32–35

[56] References Cited
UNITED STATES PATENTS

| | | | |
|---|---|---|---|
| 2,971,889 | 2/1961 | Swintosky | 424/31 |
| 3,247,066 | 4/1966 | Milosovich | 424/37 |
| 3,341,416 | 9/1967 | Anderson et al. | 424/35 |
| 3,432,593 | 3/1969 | Shepard | 424/20 |
| 3,538,214 | 11/1970 | Polli et al. | 424/19 |
| 3,584,113 | 6/1971 | Takebe et al. | 424/22 |
| 3,608,063 | 9/1971 | Banker | 424/22 |
| 3,629,392 | 12/1971 | Banker | 424/22 |
| 3,629,393 | 12/1971 | Nakamoto et al. | 424/22 |
| 3,691,090 | 9/1972 | Kitajima et al. | 252/316 |
| 3,775,537 | 11/1973 | Lehmann et al. | 424/21 |
| 3,835,221 | 9/1974 | Fulberth et al. | 424/20 |

Primary Examiner—Shep K. Rose
Attorney, Agent, or Firm—Merriam, Marshall, Shapiro & Klose

[57] ABSTRACT

Oral drug preparations are described, having a protracted effect and a suitable rate of release of the drug during its period of action, said preparations comprising a pharmaceutically active component to which has been admixed one or more buffers, and possibly other pharmaceutically acceptable adjuvants, the mixture having been shaped into small particles and subsequently been coated with a film-forming material allowing for diffusion of stomach juice and intestinal juice together with the drugs dissolved therein, but not being soluble in the said juices.

3 Claims, No Drawings

ORAL DRUG PREPARATIONS

The present invention relates to new oral drug preparations having a protracted effect and a suitable rate of release of the active component during the period of action, and to a process of producing the same.

The oral drug preparations of the invention comprise an active component, possibly admixed with pharmaceutically acceptable adjuvants, which has been shaped into small, preferably ball-shaped particles i.e. spheroidal, and subsequently coated with a film-forming material allowing for diffusion of stomach juice and intestinal juice together with drugs dissolved therein, but not being dissolved by the said juices.

While passing through the human digestive tract, orally administered drugs are subjected to pH-values varying from 1.0 to 7.4. Thus the saliva of the mouth has a pH of 7, the stomach juice of a fasting person has normally a pH of 1, which may vary between 1.0 and 4.0 pursuant to consumption of food, bile has pH 7.0 to 7.4, and in the intestines pH is 5 to 7.

Moreover, the orally taken drug stays for varying periods in the individual parts of the digestive tract.

Together with the fact that the solubility of many drugs is dependent upon the pH of the solvent medium this results in making it extremely difficult to obtain even approximately the same rate of release everywhere in the digestive tract, even if attempts in this respect have not been missing.

Thus, it has been proposed to use combinations of coatings which are soluble in the stomach juice and the intestinal juices, respectively. By producing a tablet, for example, by first coating a smaller tablet of the active substance with a layer of a material not soluble in the stomach juice, but soluble in the intestine juices, and then depositing a layer of the active substance upon this coating, which is again coated with a layer of a material soluble in the stomach juice, part of the active substance will be released in the stomach, the remainder being released in the intestines. Thus, the period of action can be prolonged, but the release takes place in portions and owing to the pH dependent solubility of the coatings, the released drug will be available for different periods from time to time.

Better results have been achieved by using coatings of various synthetic polymers which have been modified by means of solubilizing groups, e.g. quaternary ammonium groups. Thus, it is possible to produce coatings, the solubility and the permeability of which are independent of the physiological pH within the range 2–8, since by carefully adjusting the content of quaternary ammonium groups to a low value, it is possible to obtain coatings being insoluble, but to some extent swelling in water. In principle, such coatings function in the way that stomach juice or intestinal juice diffuses in or out through the coating, gradually dissolving the active substance.

More recently, the efforts have been directed to finding suitable combinations of polymers in order to control the diffusion rate and thereby the release of the coated active substance, cf. the Danish Pat. Nos. 117,656 and 122,708. Danish Pat. No. 122,708 was granted on an application based on U.S. Pat. application Ser. No. 800,827 filed Feb. 13, 1969 which issued as U.S. Pat. No. 3,634,584.

Even if it is maintained that a pH independent release of the enclosed drugs can be obtained by means of these coatings, experiments have shown, however, that this is not always so and that often individual adjustment of the properties of the coating is necessary, when the active substance is replaced by another active substance.

It is an object of the present invention to provide drug preparations of the said kind which without any individual adjustment of the coating ensures a pH independent release of the active substance at a substantially constant rate.

This is accomplished, according to the invention, by the addition to the material, from which the particles are prepared, of a buffer or mixture of buffers which is so chosen, dependent upon the kind of active substance, that a suitable pH is obtained for dissolving said active substance in the body fluid permeating the coating.

The buffer or mixture of buffers is chosen, having regard to the stability and solubility of the other components of the preparation, so as to impart a pH-value from 1 to 7.5, preferably from 4 to 6, to the buffered system.

The amount of buffer must be sufficient to ensure a buffer effect during the time it takes for the drug to be released from the composition particles. Thus, the proportion of buffer to drug will be dependent on the rate of diffusion of both through the coating material, and is easily determined by simple tests for a given combination of drug, buffer and coating material.

The diameter of the particles will generally be from 0.1 to 5 mm, preferably 0.5 to 1.5 mm.

The mode of action of the compositions obtained in this manner is as follows:

The fluids in the digestive tract, e.g. stomach juice and intestine juice, can penetrate through the coating, acting as a diffusion membrane. The fluid thus passing through the coating into the interior of the particles will dissolve the buffer and thus get a pH suitable for dissolving and possibly ionizing the drug to create a solution of it in equilibrium with solid matter. Owing to the differences in concentration on the inner and outer sides of the membrane, the said solution will diffuse out into the surrounding body fluid, and further fluid will pass in so that a slow, substantially constant release of the drug takes place, and this will be independent of the pH of the body fluid proper.

An additional advantage is that an adjustment of the coating composition to the kind of drug used becomes unnecessary, since instead the drug is adjusted by means of the buffer which is by far easier than an adjustment of the composition of the coatings to the individual drugs.

The drugs, which may be used in the preparations of the invention, may be of acid as well as of basic or neutral character in solution. As examples of the former may be mentioned valeric acid, ascorbic acid, 1-(m-trifluoromethylphenyl)-2-(N-ethylamino)-propane,HCl, and barbituric acids, whereas ephedrine, atropine, pyridoxine, and codeine are examples of drugs of basic character, and reserpine and theophylline are examples of drugs forming neutral solutions.

The buffers to be used should be physiologically acceptable and could be e.g. primary, secondary, or tertiary salts of phosphoric acid, or salts of phthalic acid, citric acid, tartaric acid, or salts of amino acids, e.g., glycine, or mixtures of the said buffer salts. As the coating material, various of the dragee lacquers on a polymer basis now in the market may be used, e.g., those based upon cellulose derivatives or acrylic polymers.

The following experiments are illustrative of the effect obtained by the preparations of the invention.

In the first experiment a coating composition consisting of the following ingredients was used:

|  | Parts by Weight |
|---|---|
| Acrylic polymer | 50 |
| Pigment | 0.667 |
| Talc | 9.833 |
| Acetyltributyl citrate | 0.74 |
| Isopropanol ad | 100 |

With this composition, two lots of cores A and B without and with buffer, respectively, were coated, the compositions of A and B in parts by weight being as follows:

|  | A | B |
|---|---|---|
| 1-(m-Trifluoromethylphenyl)-2-(N-ethylamino)-propane,HCl | 40.0 | 40.0 |
| Saccharose | 38.0 | 17.0 |
| Microcrystalline cellulose | 20.0 | 20.0 |
| Hydroxypropyl cellulose | 2.0 | 3.0 |
| Monosodium phosphate | — | 20.0 |

The release of the drug in synthetic stomach juice and intestinal juice having a pH of 1.5 to 7.2, respectively, was determined periodically. The results are given in the following table, the figures representing the weight percent of the total content of the drug, which was released within the stated period.

| Composition | pH | Percent by weight released after hours | | | | | | |
|---|---|---|---|---|---|---|---|---|
| | | 1 | 2 | 3 | 4 | 5 | 6 | 7 | 8 |
| A | 1.5 | 10 | 17 | 20 | 66 | 42 | 88 | 92 | — |
| B | 1.5 | 3.5 | 7 | — | 13.5 | — | 24.5 | — | 45.5 |
| A | 7.2 | 3.5 | 8 | 15 | 22 | 40 | 77 | 87 | — |
| B | 7.2 | 4 | 6.5 | — | 11 | — | 22 | — | 45 |

The table shows that the release of the drug of composition B is proportional to the time and independent of the pH.

In a second experiment, compositions C and D without and with buffer, respectively, were used, composed as follows in parts by weight:

|  | C | D |
|---|---|---|
| Dextropropoxyphene chloride | 65 | 65 |
| Saccharose | 18 | 15 |
| Talc | 14 | 7 |
| Klucel (Hyrdoxypropyl cellulose) | 3 | 3 |
| Monosodium phosphate | — | 10 |

The coating material was as follows in parts by weight:

|  |  |
|---|---|
| Ethyl cellulose 100 cp | 5 |
| Talc | 3.5 |
| Acetyltributyl citrate | 0.5 |
| Isopropanol ad | 100 |

The release of the drug in synthetic stomach juice and intestinal juice at the pH-values 1.5, 4.5, and 7.2 was determined after 1, 4, and 7 hours, the results appearing from the table below:

| Composition | pH | Percent by weight released after hours | | |
|---|---|---|---|---|
| | | 1 | 4 | 7 |
| C | 1.5 | 62.6 | 86.5 | 90.8 |
| C | 4.5 | 65.2 | 86.2 | 89.5 |
| C | 7.2 | 48.2 | 71.2 | 83.5 |
| D | 1.5 | 29.2 | 68.4 | 80.5 |
| D | 4.5 | 29.0 | 68.1 | 79.4 |
| D | 7.2 | 27.8 | 69.1 | 80.5 |

Again, in the buffered composition D, the release of the drug is independent of the pH.

What is claimed is:

1. An oral drug preparation having a protracted effect and a substantially constant rate of release of the drug, comprising an admixture, of a drug and an effective amount of a buffer acid, buffer acid salts, and mixtures thereof, in the form of small spheroidal particles of 0.1 to 5 mm diameter, said particles having a coating thereon of a film-forming ethyl cellulose drug-diffusing dragee lacquer, allowing for diffusion of the stomach and intestinal juices through the coating, but not being soluble in said juices.

2. An oral drug preparation according to claim 1 in which the amount of buffer imparts a pH between 1 and 7.5 to the particle contents diffused by said juices.

3. An oral drug preparation according to claim 1, in which the amount of buffer imparts a pH between 4 and 6 to the particle contents diffused by said juices.

* * * * *